United States Patent [19]

Getreuer et al.

[11] Patent Number: 4,855,977

[45] Date of Patent: Aug. 8, 1989

[54] TRACK SEEKING APPARATUS AND METHOD USING SAMPLED INFORMATION

[75] Inventors: Kurt W. Getreuer; David L. Schell, both of Colorado Springs, Colo.

[73] Assignee: Laser Magnetic Storage International Company, Colorado Springs, Colo.

[21] Appl. No.: 78,264

[22] Filed: Jul. 27, 1987

[51] Int. Cl.⁴ .................. G11B 17/22; G11B 15/18
[52] U.S. Cl. ........................... 369/32; 369/33; 369/44; 360/72.2
[58] Field of Search ................... 369/32, 33, 44; 360/72.2

[56] References Cited

U.S. PATENT DOCUMENTS

| | | | |
|---|---|---|---|
| 4,607,358 | 8/1986 | Maeda et al. | 369/44 |
| 4,608,676 | 8/1986 | Yoshida et al. | 369/32 |
| 4,615,023 | 9/1986 | Inada et al. | 369/32 |
| 4,627,038 | 12/1986 | Abed et al. | 369/44 |
| 4,630,250 | 12/1986 | Nonomura | 369/32 |
| 4,719,610 | 1/1988 | Bates et al. | 369/32 |
| 4,774,699 | 9/1988 | Giddings | 369/32 |

FOREIGN PATENT DOCUMENTS 0241978  10/1987  European Pat. Off. .......... 369/32 X Primary Examiner—William L. Sikes
Assistant Examiner—Brian M. Healy
Attorney, Agent, or Firm—Sheridan, Ross & McIntosh

[57] ABSTRACT

A track seeking method is provided which relies on sampled seek information. No external sensors are employed and the seek information is intermittently stored along the tracks provided on the disk surface. In determining the actual velocity of the seek actuator, at least two methods for counting crossed tracks are utilized. Preferably, a ½-count method is used at lower seek velocities and a 16-count method is used at higher seek velocities. The 178-count method involves the receipt of two counts for each track that is crossed, while the 16-count method involves counting every sixteen tracks that are crossed. The selection of the ½-count and the 16-count methods for counting tracks crossed results in a velocity gap region. The velocity gap region is a range of seek actuator velocities in which the servo loop is underdamped for the 16-count method and where folding occurs for the ½-count method. To overcome the underdamping and folding problems, various solutions have been devised. In one embodiment, the velocity profile is configured so that the gap region is crossed in a relatively short amount of time and the 16-count method is used in providing velocity feedback.

44 Claims, 15 Drawing Sheets

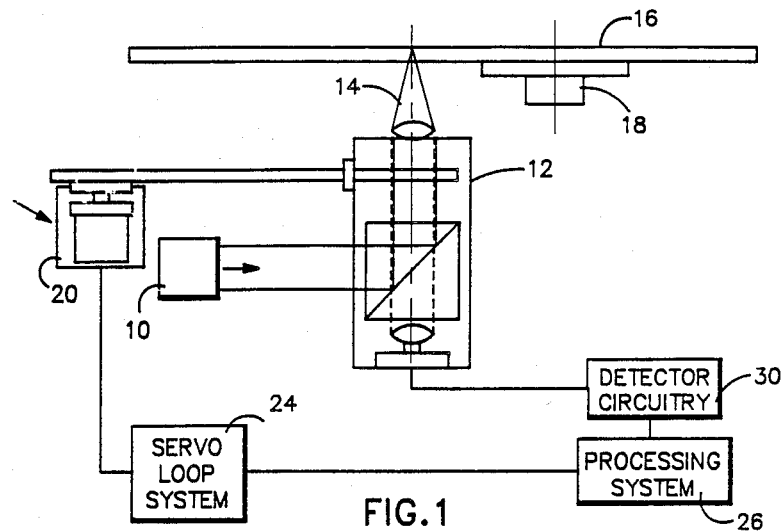
FIG.1
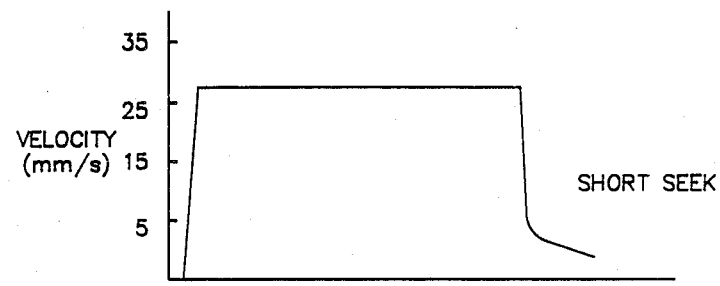
FIG.3  SHORT SEEK
REMAINING TRACKS TO BE CROSSED
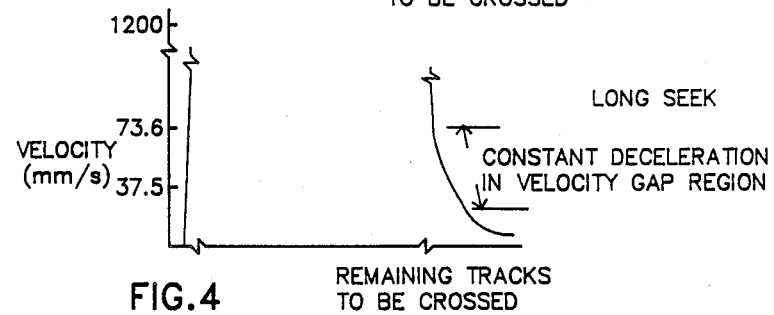
FIG.4  LONG SEEK
CONSTANT DECELERATION IN VELOCITY GAP REGION
REMAINING TRACKS TO BE CROSSED

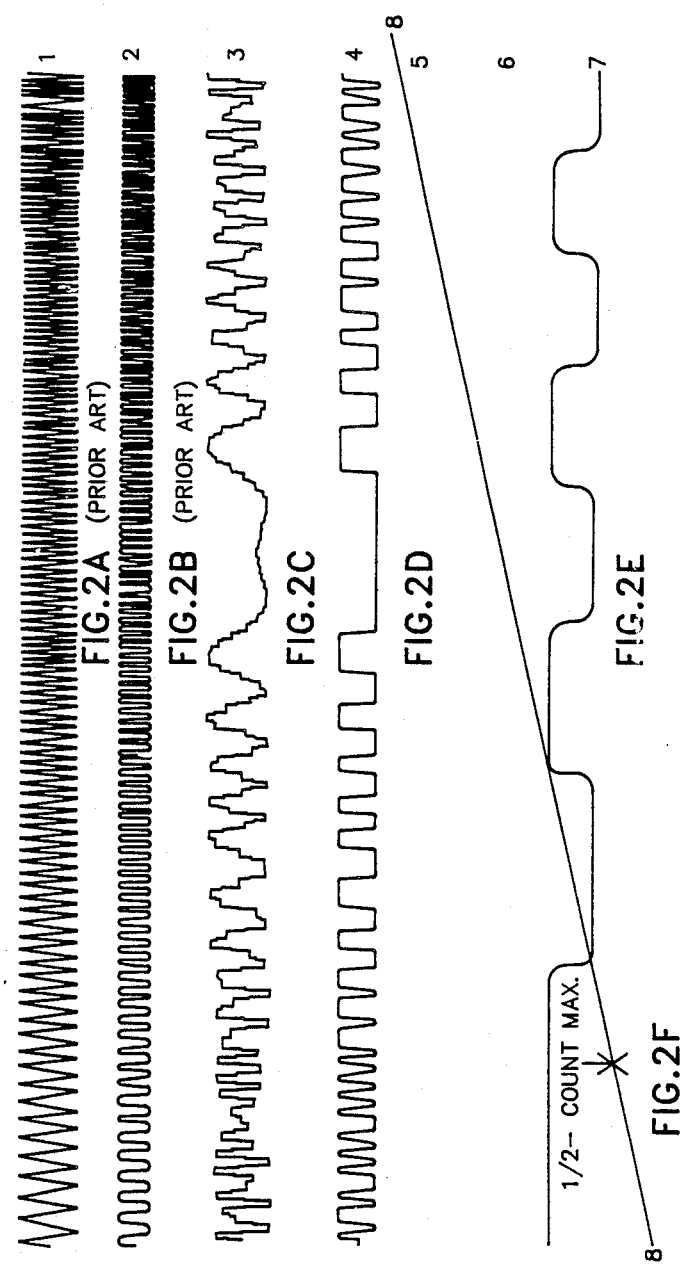

TRACK SEEKING APPARATUS AND METHOD USING SAMPLED INFORMATION

FIELD OF THE INVENTION

The present invention relates to apparatus and method for track seeking and, in particular, to a method for track seeking that relies on seek information stored along disk tracks in a discontinuous manner.

BACKGROUND OF THE INVENTION

In accessing a desired or target track on a disk that stores data or other information, servo control is utilized in order to properly perform the track seek operation. In a first known optical disk drive system, continuous seek-related information is provided on the disk by a continuous pregroove, which generates a radial push-pull signal from which track counts can be derived. Based on the number of track counts over a measured time period, the actual velocity of a seek actuator can be calculated, the seek actuator being used in moving the light beam across disk tracks. The magnitude of the actual velocity is compared with a predetermined and desired velocity whereby a velocity error signal can be found. The velocity error signal is outputted by a seek servo loop which is used to control the velocity of the seek actuator so that the light beam is properly positioned relative to the desired track. This known method has a number of disadvantages. Data pits formed in the tracks interfere with proper counting of the tracks by means of the continuous pregroove. The magnitude of the seek velocity is thereby reduced by such interference. In this method, the performance of the seek operation is dependent upon the data modulation format stored in the tracks of the disk, which limits the user to a certain data format. Also, a relatively significant amount of analog signal circuitry is required to remove the data signal from the track count signal, e.g., filters, sample and hold circuits, automatic gain control circuits, and comparators.

In a second known method for track seeking in an optical disk system, track seeking is accomplished using two different techniques, depending upon the length of the seek or the distance the desired track is from the current position of the light beam used in reading or writing. In this system, for relatively short seeks, conventional methods for track counting are utilized, such as relying on servo information stored or provided on the disk surface. For relatively long seeks, a sensor external to the disk is utilized in arriving at the number of tracks that were crossed in any given time period. The external sensor controls a coarse actuator used in positioning the light beam. As an example of an external sensor, a Moire type optical ruler is used until it is determined that the desired track being sought is within a predetermined number of tracks relative to the current position of the light beam. Such hardware and method results in additional costs for the external sensor and accompanying electronics. This particular two-step technique is also a relatively cumbersome implementation of a seek operation.

Also previously devised is the use of an alternating pit position in servo bytes stored on a disk track. In Netherlands App. No. 8600934, filed Apr. 14, 1986, corresponding to European Pat. Appl. No. 0241978, and entitled "Optical Record Carrier and Apparatus For Reading the Record Carrier," the use of an alternating pit is disclosed. A pit is provided in a selected one of a number of servo byte positions for a predetermined number of tracks and then the pit position is changed for the next predetermined number of tracks. This altenating of the pit position is continued. The alternating pit is used in providing track addressing information. The use of the alternating pit is employed in the present invention. However, unlike the previous application, the use of the alternating pit is in connection with velocity feedback in order to provide an accurate and controlled seek operation.

The known prior art does not address problems and solutions thereto that were encountered in connection with devising and/or implementing the controlled seek operation of the present invention, which relies on servo information that is inermittently stored along each disk track. A major objective of a track seek operation is to minimize the time taken to reach or capture a desired or destination track, as well as to avoid undershooting or overshooting of the desired track. In achieving this objective in the system of the present invention which relies on sampled information stored or provided on the disk surface, two competing considerations are taken into account or balanced. First, the actuator velocity must be sufficiently great at the high end of the velocity spectrum of the seek actuator to minimize the access time to the desired track while avoiding unwanted "folding or aliasing" effects. Second, underdamping of the servo loop should be avoided or minimized. With regard to the first consideration, folding occurs when the actuator velocity is equal to or greater than a certain velocity in a sampled seek system. For example, in the case in which servo information repeats every 20 microseconds for a given rotational speed of the disk, then velocities which are above 50 kHz (1/20 microseconds) cause folding. That is, because the servo information is intermittently located along the disk tracks, above a certain velocity, tracks being crossed will not be counted. The velocity of the actuator is so great relative to the rotational speed of the disk that servo information for one particular track may not be accessed during the passage of the light beam across the one particular track. To overcome this problem, a track counting method is employed by the present invention whereby a significantly much greater velocity of the actuator must be exceeded before folding occurs. This selected counting method is intended to allow the actuator to move as fast as is desired in the particular application.

However, the use of such a counting method also results in the establishment of a seek actuator minimum velocity below which the servo loop system does not properly function, i.e., reliance on such a counting method below the minimum velocity would result in an underdamped servo loop. To overcome this problem relating to loop stability, another counting method was arrived at for deployment when the actuator velocity was below this minimum velocity. It was determined that this other counting method has associated with it a maximum actuator velocity that is less than the aforesaid minimum actuator velocity. Because of this difference, there is a "velocity gap region" between the maxiumu velocity of the one counting method and the minimum velocity of the other counting method. The present invention identifies various methods that can be utilized when the actual actuator velocity corresponds to one of the velocities identified as being in the velocity gap region. A discussion of such solutions and the preferred methods of counting tracks crossed, depending upon the current seek actuator velocity, is provided in the following descriptions of the embodiments of the present invention.

SUMMARY OF THE INVENTION

The present invention is directed to a controlled seek operation. In the preferred embodiment, the actual velocity of the seek actuator is determined using at least two track counting methods. The servo information used in both methods for counting the number of tracks crossed is discontinuous or intermittently found on the disk surface. In one embodiment, a first track counting or "½-count" method utilizes wobble pit pairs located along each of the disk tracks. One track is counted as being crossed whenever two signal changes are detected. In the preferred embodiment, an update is made and processing is conducted for each of the signal changes, i.e., for each track crossed, the actual velocity of the seek actuator can be determined twice at relatively low velocities. In other embodiments associated with the ½-count method, a discontinuity along the track or information stored in a servo byte could be utilized in determining that a single track had been crossed by a light beam. The number of tracks crossed is used to determine the number of tracks remaining to a desired track, from which the velocity of the seek actuator can be controlled at a desired velocity.

The second track counting method relies on information stored in servo bytes provided along the tracks on the disk surface. In a preferred embodiment, a pit is alternately located in a particular position of a servo byte. Specifically, for a first set or zone of sixteen radially adjacent tracks, a pit is provided in position "three" of the first servo byte of a pair of servo bytes. The next set or zone of sixteen radially adjacent tracks has the pit stored in the "fourth" position of the first servo byte of a pair of servo bytes. This alternating of the location of the pit is used to determine whenever sixteen tracks have been crossed, i.e., the "16-count" method. The apparatus of the present invention detects a change in position of the pit read by the light beam as it traverses the disk tracks and updates a counter indicating that another sixteen tracks have been crossed. The ½-count method is employed for relatively lower seek velocities while the 16-count method is utilized with relatively higher seek velocities.

In an embodiment of the present invention, the ½-count method is used when the seek actuator velocity is between a minimum velocity of about 2.3 mm/s and a maximum velocity of 37.5 mm/s. The 16-count method is used between a minimum velocity of about 75 mm/s and a maximum velocity of 1200 mm/s of the seek actuator. The minimum value can be derived using the well-known Root Locus method in the Z-plane. For a track pitch of 1.5 micrometer, a servo loop gain of 1500 rad/s and a desired damping factor of about 0.7, a minimum track cross velocity is about 3.0 kHz. The 3.0 kHz relates to an actuator velocity with respect to the disk of about the aforestated 2.3 mm/s. This minimum velocity is achievable because of the velocity updating that is done twice per track crossed. The 37.5 mm/s velocity is the maximum velocity that can be accurately determined using the ½-count method without incurring the "aliasing or folding" problem. Briefly, folding relates to inaccurate track counting because of a too great seek actuator velocity and/or limited servo information repetition on the disk. With the track pitch of 1.5 micrometer and for a servo repetition of 50 kHz (servo information occurs every 20 microseconds), folding occurs at the aforestated 37.5 mm/s for the ½-count method (two zero detections every track crossed). Similarly, the minimum velocity for the 16-count method is about 75 mm/s (about 2.3 mm/s×32 zero crossings) and the maximum velocity is 1200 mm/s (37.5 mm/s×32 zero crossings).

From this it is seen that there is a "velocity gap region" between the maximum velocity of the ½-count method and the minimum velocity of the 16-count method, i.e., between 37.5 mm/s and about 75 mm/s. The velocity gap would be larger for higher loop gains. The present invention provides apparatus and method for controlling the velocity of the seek actuator when it has a velocity in this gap region, particularly during deceleration of the actuator.

In one embodiment, the method of counting tracks crossed, while the seek actuator is decelerating (remaining seek distance less than a predetermined number) at velocities found in the velocity gap region, is the 16-count method. The 16-count method is used during deceleration of the actuator so long as 640 microseconds has not passed since the last receipt of a 16-track count. The 640 microseconds relates to the maximum velocity of 37.5 mm/s, i.e., if this amount of time has passed, and with the aforesaid parameters, then the seek actuator velocity is expected to be less than or equal to 37.5 mm/s. Thus, whenever more than 640 microseconds has passed since the last 16-count was obtained using the 16-count method, the method for track counting is switched to the ½-count method. This solution to the problem associated with the existence of the gap recognizes that the velocity gap region is passed in a relatively short period of time. Even though servo loop damping is undesirably low for the 16-count method during the range of velocities in the gap, the velocity gap is passed in relatively short time period such that the encountered underdamping does not adversely affect the seek operation. For example, a velocity profile can be devised for this region whereby there is constant deceleration. The velocity profile is devised so that a constant deceleration of the seek actuator is achieved starting greater than 75 mm/s, i.e., at about between 100–130 mm/s. For constant decelerations of 20 m/s$^2$, the velocity gap region is passed in about 2 milliseconds. Consequently, the servo loop is only underdamped for about 2 milliseconds. Further, because of the momentum of the seek actuator moving in the desired direction when the gap region is entered during deceleration, full control of the seek actuator is maintained for velocities thereof in the velocity gap region. With regard to accelerations of the actuator, the velocity profile can be devised, in light of achievable accelerations of the actuator, such that the minimum velocity of about 75 mm/s is reached in a minimal amount of time without real concern about servo loop underdamping. Preferably, this is accomplished because seek actuator acceleration during this period is substantially greater in comparison with disturbances that could affect seek actuator movement.

In another embodiment of the present invention, the counting of tracks crossed in the velocity gap is accomplished by means of yet another counting method, e.g., a "4-count" method. To achieve such a count, a pit position of a servo byte would be alternated every four tracks. The velocity boundaries associated with the four track count would have a minimum velocity less than the maximum velocity of the ½-count method and a maximum velocity greater than the minimum velocity of the 16-count method. Consequently, there is overlap among the three methods for track counting.

Further techniques can be employed in controlling the seek actuator velocity in the velocity gap region. Such techniques are subsequently described herein including their interaction with other track counting methods.

Based on this summary description, a number of objectives of the present invention are easily recognized. A controlled seek operation is implemented without the use of an external sensor. The seek operation does not require the use of continuous track crossing information such as a pregroove. All of the information needed to develop a track count is found or stored on the disk surface itself. Numerous and relatively cumbersome hardware and processing electronics are not required by the present invention. Various methods have been identified for implementation to overcome the problem created when ½-count and 16-count methods are utilized to determine seek actuator velocity. As a consequence, any folding or unwanted underdamping of the servo loop can be overcome or taken into consideration so that the track seek operation is accomplished rapidly and accurately.

Additional advantages of the present invention will become readily apparent from the following discussion when taken in conjunction with the accompanying drawings.

BRIEF DESCRIPTION OF THE DRAWINGS

FIG. 1 is a block diagram of an apparatus of the present invention;

FIGS. 2A-2B illustrate signals generated using a continuous pregroove in accordance with a prior art track seek method;

FIGS. 2C-2D illustrate signals relating to the ½-count method for track counting using sampled servo information and the folding that occurs at a known actuator velocity;

FIG. 2E illustrates a signal relating to the counting of every 16 tracks crossed;

FIG. 2F is a curve of seek actuator velocity versus time;

FIG. 3 illustrates a velocity profile associated with a short seek operation;

FIG. 4 illustrates a velocity profile associated with a long seek operation;

DETAILED DESCRIPTION OF THE EMBODIMENTS

Figure 5A:
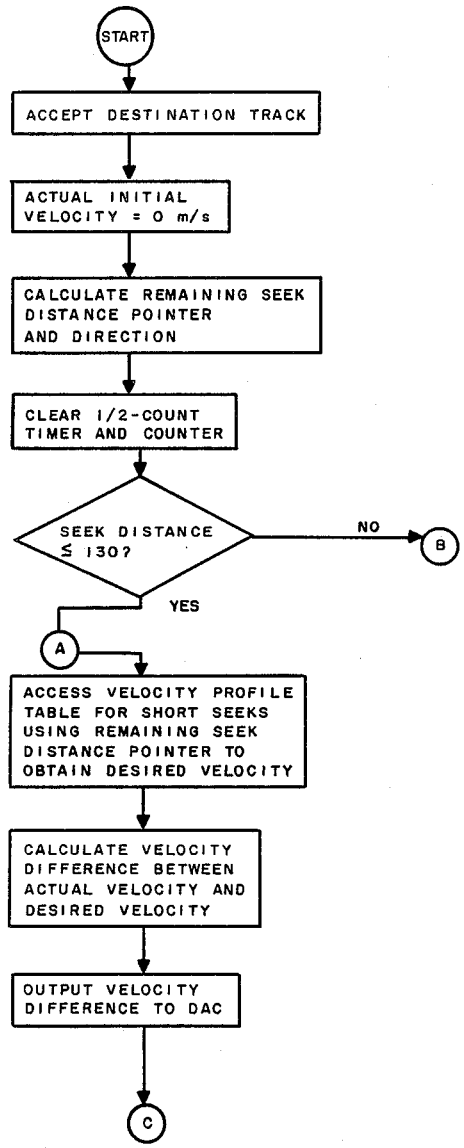
FIGS. 5A and 5B are a diagram outlining steps associated with performing a short seek operation.

The present invention is directed to controlling the movement of a read/write beam relative to a rotating disk having a number of tracks in order to position the read/write beam at a location on the disk to read from or write on the disk tracks. In reaching the desired or target track, the present invention relies on servo information that is sampled as the beams moves towards the desired track.

With reference to FIG. 1, an apparatus of the present invention is illustrated in block diagram form. As can be seen, the apparatus includes a laser or light source 10, which directs collimated light towards a laser optics assembly 12. The laser optics assembly 12 is a conventional apparatus including a number of optic-related elements commonly used in optical recording for outputting a read/write beam 14 of light and receiving back modulated light reflected by a disk 16. The disk 16 is rotatable using a drive mechanism 18. The disk 16 has a number of spiral and radially adjacent tracks, which are essentially concentrically related. At least a substantial number of each of the tracks includes information or data, which is stored on the disk 16 by the user. Also provided on the disk 16 is servo information. The servo information is not continuous, but is intermittently located along the tracks. Such servo information can take many forms so long as it can be used for counting tracks crossed by the read/write beam 14 as it traverses the disk 16. Preferred or desired forms of servo information will be discussed later in connection with a description of the counting methods that are employed by the present invention.

The apparatus also includes a seek actuator 20, which is operably connected to the laser optics assembly 12. The actuator 20 is used in moving at least portions of the laser optics assembly 12 in order to position the read/write beam 14 in a desired position relative to the disk 16. The movement of the actuator 20 is controlled using a servo loop system 24, which is operatively connected to the actuator 20. Typically, the actuator 20 includes a coil that is energized using current outputted by the servo loop system 24, which typically includes a digital-to-analog converter (DAC). The servo loop system 24 is operatively associated with a processing system 26, which includes hardware and software for use in performing the tracking operations of the invention. Also associated with the processing system 26 is detector circuitry 30, which communicates with the laser optics assembly 12. The detector circuitry 30 is primarily used to receive and process light information received from the laser optics assembly 12. The detector circuitry 30 is known and conventional and generates electrical signals representing the intensity of the incident or returned light resulting from the reflection from the disk 18. Consequently, the detector circuitry 30 outputs electrical signals from which tracking control can be achieved. In one embodiment and by way of example, the detector circuitry 30 includes a synchronizing circuit which develops control signals synchronized with the instance at which the read/write beam 14 scans a servo byte.

In achieving the desired tracking control, the present invention is directed to performing seek operations whereby a desired or target track is approached and accessed as rapidly as can be accomplished using sampled rather than continuous information. A representative illustration of track counting information used in a seek operation in which the information is located in a continuous manner along disk tracks is found in FIG. 2A. FIG. 2A illustrates the electrical signal generated as a result of track crossings as the read/write beam 14 traverses the disk 16 on its path towards the desired track. The track crossing signal of FIG. 2A is generated using a continuous pregroove formed on the surface of the disk 16. The signal of FIG. 2A is typically applied to a zero crossing detector circuit to produce a digital pulse waveform, as illustrated in FIG. 2B. The leading and trailing edges of the pulses correspond to the zero crossings of the sinusoid illustrated in FIG. 2A. As can be understood from the signal portions located at the right side of the FIGS. 2A-2B, as the velocity of the actuator increases, the repetition rate of the signal or pulses also increases. As would be expected, because the information used in track counting is continuous, no track count should be missed by the read/write beam during its movement across disk tracks.

To achieve the necessary track counting for subsequent use in controlling the seek operation of the present invention which relies on sampled information, two methods of counting tracks crossed are utilized. A first method is a ½-count method and the second method is preferably a 16-count method. The ½-count method refers to a method whereby each of the tracks crossed is individually counted and, for each track crossed, zero crossing signal detection is achieved twice so that velocity information can be determined twice for each track crossed. As an example, each individual track includes servo information made up of pairs of wobble pits. For each pair of wobble pits, one is located on one side of the track and the other is located on the opposite side of the track and near the first wobble pit. As the read/write beam traverses each track, the difference of these two pits creates a sine-like signal with a period substantially equal to that of the track pitch. The use of wobble pits to generate a track crossing signal is well-known.

With reference to FIGS. 2C and 2D, signals generated as a result of track crossings are illustrated. FIG. 2C is generated by the detection circuitry 30 and is an electrical signal representation of the read/write beam as it traverses servo information, such as wobble pits, located along the disk tracks. FIG. 2D illustrates the output of zero detector circuit, for example, which is also part of the detection circuitry 30, and has as its input the signal waveform of FIG. 2C.

The 16-count method refers to a method for counting tracks crossed wherein only every 16 tracks crossed are counted. In providing servo information that is used in achieving the 16-count method, it is preferred that the servo information be stored along the disk tracks in the form of annular zones, wit each zone comprising sixteen disk tracks. Such an approach for providing servo information is disclosed in The Netherlands Patent Application No. 8600934, filed Apr. 14, 1986, corresponding to European Pat. Appl. No. 0241978, and entitled "Optical Record Carrier and Apparatus for Reading the Record Carrier," the subject matter thereof being incorporated herein by reference. Briefly, the record carrier disclosed in the subject patent application stores servo information in servo bytes. More particularly, a pit is provided in a selected one of the bits of a servo byte for a number of adjacent, essentially concentric tracks and, for a number of other successive tracks, the pit is provided or stored in another selected bit of the servo byte. In the cae of the 16-count method, a pit is stored in a first selected bit of the servo byte for sixteen adjacent and concentric tracks. For the next adjacent sixteen concentric tracks, the pit is provided or stored in another position of the servo byte. In one embodiment, for sixteen tracks, the pit is located in position 3 of the servo byte. For the next successive sixteen tracks, the pit is located in position 4. This alternating of the pit position continues for successive sets or zones of sixteen tracks. Using the detection of the change in the position of the pit, the apparatus is able to detect that sixteen tracks have been crossed as the read/write beam rapidly traverses concentric disk tracks in a generally radial direction. Unlike the present invention which uses the alternating pit for both velocity feedback in a controlled seek operation and for addressing purposes, the invention of The Netherlands application uses the alternating pit only for addressing in order to identify a desired track address. With reference to FIG. 2E, the output of the detection circuitry 30 is illustrated, as concerns the 16-count method for counting tracks. As can be seen in FIG. 2E, the digita pulse waveform change its level at every sixteen tracks crossed. As the velocity of the actuator 20 increases, the width of the pulses associated with the 16-count method decreases and the repitition of the leading and trailing edges of the pulses increase since the number of sixteen tracks crosses increase with increasing seek actuator velocity.

The apparatus of the present invention incorporates or integrates two methods for counting in order to overcome competing problems that result with the use of sampled seek information. When using the ½-count method, at a known seek actuator velocity, a "folding or aliasing" problem occurs. Folding refers to a failure to count tracks crossed due to excesive seek actuator velocity and limited servo information provide along the disk tracks. That is, at velocities equal to and greater than a known velocity, an accurate track count cannot be achieved using the ½-count method since not all crossed tracks would be counted using this method. It has been determined that, in one embodiment of the invention for the ½-count method, an inaccurate track count starts to occur at and above a seek actuator velocity of 37.5 mm/s. The folding problem is illustrated in FIG. 2D, together with reference to FIG. 2F. FIG. 2F illustrates seek actuator velocity versus time. As can be discerned, the velocity of the actuator 20 increases over time. At a maximum actuator velocity using the ½-count method, the track count becomes inaccurate. This is represented by the designation "½-COUNT MAX" on the velocity curve of FIG. 2F. The corresponding time associated with the track count signal of FIG. 2D reveals that, beginning with this maximum seek actuator velocity, the signal representing tracks crossed fails to reflect the actual number of tracks crossed. That is, instead of the number of pulses of FIG. 2D increasing with increased actuator velocity, there is actually a decreae in the number of pulses.

To overcome this folding problem, the 16-count method is utilized. The 16-count method does not result in a folding problem until the seek actuator velocity is about 1200 mm/s. Referring to FIG. 2E, it is seen that the change in pulse level reflecting the fact that sixteen tracks have been crossed is an accurate representation of the actual number of tracks crossed. For most desired applications, such a seek actuator velocity will not be reached and folding will not occur. The 16-count method, however, cannot be used for velocity feedback in connection with the complete range of possible seek actuator velocities. That is, at relatively lower velocities, the use of the servo information associated with the 16-count method will result in an underdamped servo loop system at such lower velocities. Loop stability, or the avoidance of unwanted servo loop underdamping, is a function of a number of parameters including loop gain, actuator velocity, sampling frequency, and the time delay taken to make the necessary calculations for controlling the seek actuator velocity. For a given minimum actuator velocity and a determined calculation time delay associated with a seek operation, the loop stability can be enhanced by lowering the loop gain or increasing the sampling frequency. That is, by decreasing the loop gain or increasing the repetition of servo information, the minimum velocity associated with the 16-count method could be reduced. As a practical matter, it is difficult to achieve these modifications. The sampling frequency can be increased by either increasing the rotational speed of the disk or by increasing the frequency of available servo information. First, the rotational speed of the disk is at its practical upper limit. Secondly, additional servo information stored on the disk means more storage space unavailable for the user. Similarly, lowering the loop gain might undesirably increase the sensitivity of the disk drive to disturbances, such as vibration, shock, gravity and friction whereby such disturbances would adversely affect the determination of tracks crossed and the actual velocity of the seek actuator.

It has been determined, in one embodiment of the invention, that the 16-count method functions favorably starting at a seek actuator velocity of about 75 mm/s. This magnitude was determined by conventional and known analytical techniques. By way of exmaple, for a track pitch of 1.5 micrometer wherein two pulses are generated per track crossing, and for a desired damping factor of about 0.7, the minimum track crossing velocity is about 3.0 kHz, which corresponds to a seek actuator velocity relative to the disk of about 2.3 mm/s. This minimum actuator velocity of about 2.3 mm/s relates to the ½-count method (two pulses generated per track crossed). Since an essentially linerar relationship exists, the minimum actuator velocity associated with the 16-count method is about 75 mm/s (2.3 mm/s×32 zero crossings). Since undesirable underdamping occurs below about 75 mm/s and folding occurs above 37.5 mm/s, a "velocity gap region" results between the two counting methods.

Because, as a practical matter, it is difficult to eliminate the velocity gap region, the present invention discloses methods for overcoming or taking into account seek actuator velocities found in the velocity gap so that an accurate seek operation is accomplished, even during the time that the seek actuator is moving at a speed greater than the maximum velocity associated with the ½-count method (37.5 mm/s) and less than the minimum velocity associated with the 16-count method (about 75 mm/s). The following describes various embodiments of the present invention and the manner in which they relate to the velocity gap problem. Generally speaking, each of the various solutions is implemented primarily through the use of software.

A first preferred method for taking into account the velocity gap region is now described with reference to FIGS. 3–6. This solution involves making a determination as to whether the seek is to be a "short" seek or a "long" seek. In the case of a short seek, the seek actuator velocity is always below the maximum velocity at which folding can occur. For the ½-count method, the seek actuator velocity is maintained in the range of between about 25–30 mm/s. In one embodiment, the short seek is limited to about 130 tracks or less to be crossed in order to reach the desired or target track. The velocity profile for such a short seek is depicted in FIG. 3. As can be understood from FIG. 3, the actuator velocity is always less than 37.5 mm/s. The leading and trailing portions of the velocity profile of FIG. 3 are relatively abrupt or short in time. During the majority and/or substantial amount of the time taken to conduct the short seek operation, the seek actuator is maintained at a constant velocity in the range between about 25–30 mm/s. Such a velocity profile curve enables the read/write beam 14 to reach the desired track location as rapidly as possible, while avoiding aliasing effects. Because this seek operation is limited to relatively short seeks, e.g., less than about 130 tracks to be crossed, a realtively fast access time is still achieved.

Figure 5B:
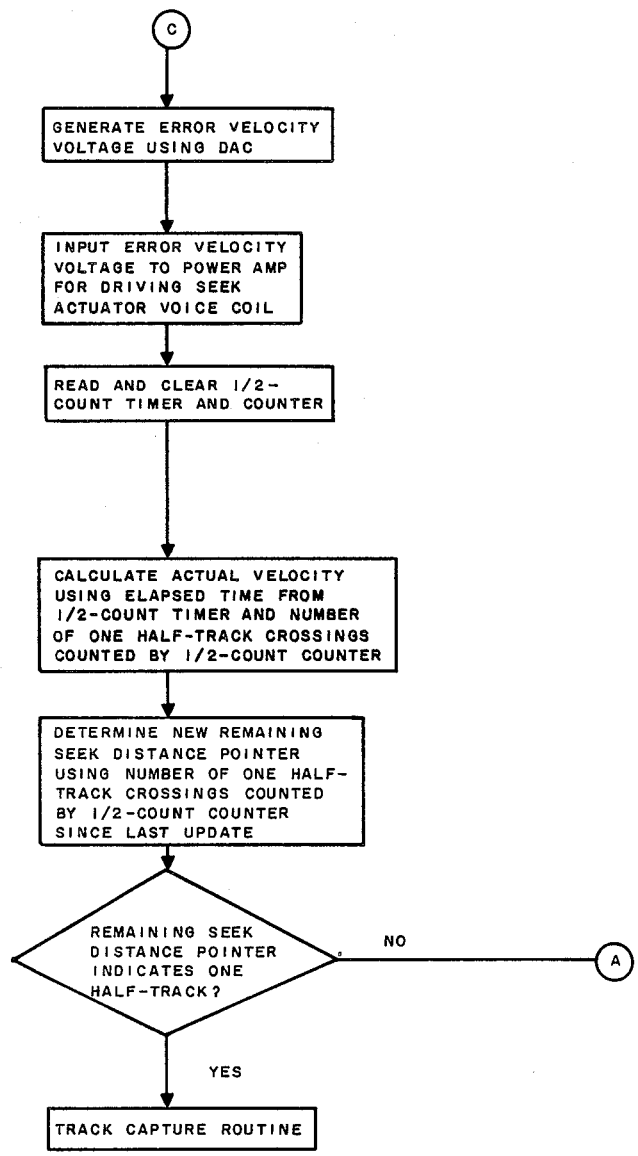

With reference to the diagram of FIGS. 5A and 5B, which outlines important steps associated with the short seek operation, in accomplishing the short seek, the number of tracks crossed by the light beam is found using the ½-count method for counting tracks crossed. From the number of ½ tracks counted using a ½-count counter over a known or measured time period using a ½-count timer, the actual velocity of the seek actuator 20 can be determined. A velocity profile table corresponding to the curve of FIG. 3 is stored in a memory operatively associated with the processing system 26. The velocity profile table correlates desired velocity and the number of remaining tracks to be crossed (remaining seek distance pointer) by the read/write beam 14 before it is positioned relative to the desired disk track. The desired velocity is the speed at which the actuator 20 should be moving for the determined number of tracks remaining to the target track. The number of tracks remaining to be crossed equals the number of tracks to be crossed known from the starting or current position of the read/write beam 14 minus the counted number of ½ tracks. A velocity error signal is generated using the difference between the determined actual velocity and the obtained desired velocity. The actuator is controlled using the velocity error signal so that the actuator is moving at a speed corresponding to the desired speed, for the determined number of tracks remaining to be crossed. The actuator is controlled by inputting an error velocity voltage from a digital-analog converter (DAC) to a power amplifier used to drive a voice coil of the seek actuator 20. The foregoing steps are repeated until the remaining seek distance pointer indicates one-half and then a track capture routine is accesed and used.

For long seeks, the actuator will be moving at velocities which are found in the velocity gap region between the ½-count method and the 16-count method for determining actual velocity. A preferred method for overcoming folding and underdamping problems for long seeks is described with particular reference to FIGS. 4, 6A and 6B. The long seek operation would typically be used for reaching tracks that are greater than or equal to 130 tracks from the initial or current location of the read/write beam 14. A velocity profile curve for the long seek operation is illustrated in FIG. 4. As can be seen in FIG. 4, the initial or leading portions of the velocity profile curve indicate an immediate and high acceleration of the actuator 20 whereby the minimum velocity of about 75 mm/s of the 16-count method is reached in a minimal amount of time. During this acceleration of the actuator to reach the 75 mm/s velocity, the 16-count method is used to determine the number of tracks crossed for use in determining the actual velocity of the seek actuator. To avoid underdamping during acceleration, the magnitude of the acceleration of the seek actuator is controlled to be relatively high in comparison with disturbances that could affect proper servo operation so that the velocity is caused to continually increae and the seek actuator moves in one, desired direction. In accomplishing this, it typically occurs that the coil of the actuator 20 is driven by a saturation current. The saturation current does not allow the servo loop system 24 to build up unwanted oscillations for the relatively short time the actuator 20 is moving at speeds found in this velocity gap region and thereby forces the actuator 20 to move in the correct direction.

With continued reference to FIG. 4, as the read/-write beam 14 approaches the target track and deceleration of the seek actuator occurs, it is seen that the seek actuator once again must reach speeds that are found in the velocity gap region. In that regard, for actuator speeds between 37.5 mm/s and about 75 mm/s, the velocity profile curve indicates a linear decreasing of the seek actuator velocity. This corresponds to a constant deceleration of the seek actuator 20. It has been determined that, for a constant deceleration of about 20 m/s$^2$, the velocity gap region is passed in about 2 milliseconds. Such an amount of time does not result in adverse underdamping of the servo loop system. Further, the velocity profile table is set up so that this constant deceleration is already well achieved before the velocity gap region. At about 100-130 mm/s, the seek actuator is being driven to achieve a deceleration of 20 m/s$^2$ wherein desired control of the seek actuator is maintained in the gap region as some momentum exists in the desired direction when the gap region is entered. In addition, as a check relating to the use of the 16-count method in the velocity gap region during deceleration, the method of this preferred embodiment includes monitoring the time between successive counts or receipt of servo information indicating that 16 tracks have been crossed. In particular, a timer stores the time since the last count was received indicating that sixteen tracks had been crossed. If the timer exceeds a predetermined amount of time, the apparatus of the present invention causes a switch from the 16-count method for counting tracks crossed to the $\frac{1}{2}$-count method. In one embodiment, the amount of time that should not be exceeded is 640 microseconds.

Figure 6A:
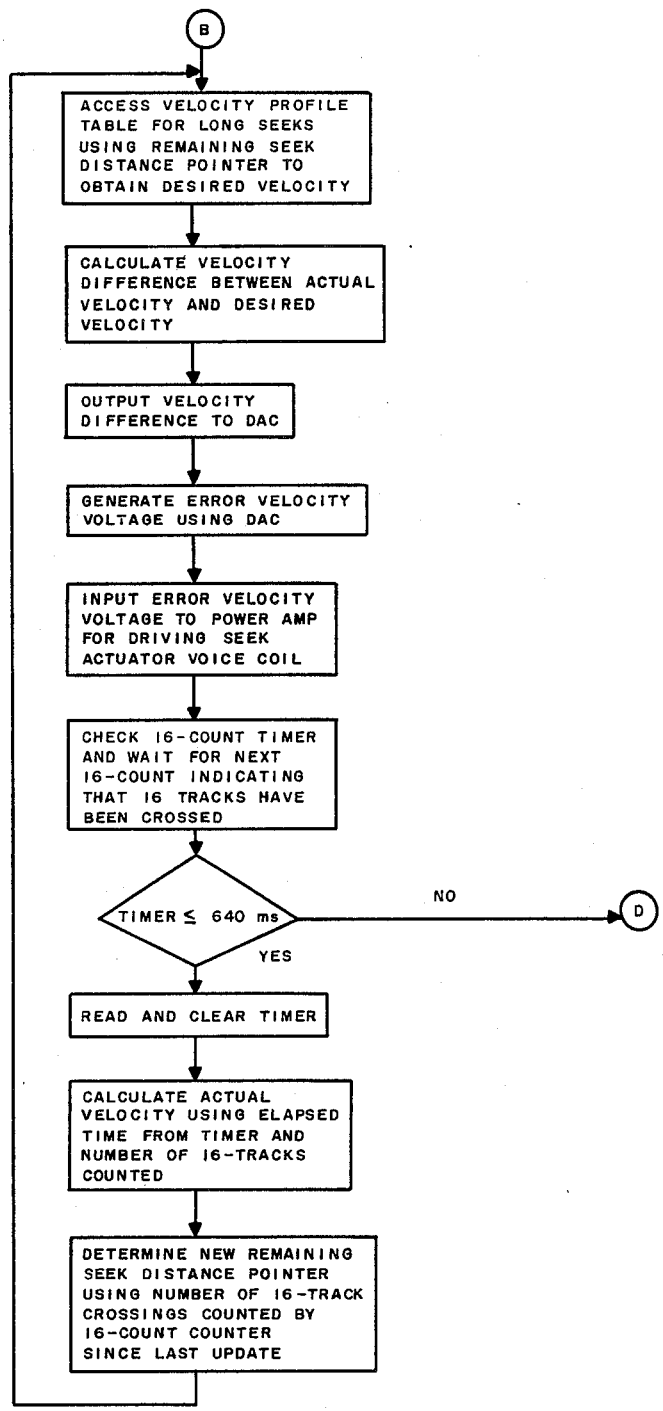
FIGS. 6A and 6B are a diagram outlining steps associated with performing a long seek operation.
Figure 6B:
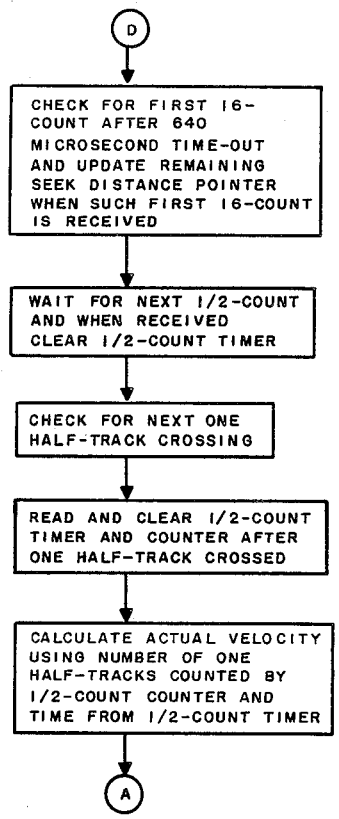

Steps taken by the hardware and software in implementing this preferred embodiment are outlined in FIGS. 6A and 6B. As the step diagram indicates, upon determining that the remaining seek distance is greater than or equal to 130 tracks, the velocity profile table for long seeks is accessed to obtain a desired velocity. A velocity difference is then determined between the actual velocity and the desired velocity. A digital-analog converter generates an error velocity voltage based on the velocity difference. The error velocity voltage is inputted to a power amp for driving the seek actuator voice coil. The software also checks a 16-count timer to determine if it has exceeded 640 microseconds since receipt of the last 16-count indicating that sixteen tracks have been crossed. If a count is received within 640 microseconds indicating that sixteen tracks have been crossed, the timer is read and cleared. The actual velocity is then calculated again using the amount of time found in the timer and the number of counts in the 16-count counter. A new remaining seek distance pointer is determined by obtaining the difference between the desired or destination track and the current track position, which is based upon the counted number of tracks crossed. After the new remaining seek distance pointer is determined, the steps associated with the long seek can be repeated.

In the case in which the timer exceeds 640 microseconds, the long seek routine is exited and the software checks for the receipt of the next $\frac{1}{2}$-count indicating that a $\frac{1}{2}$-track has been crossed. When this occurs, the $\frac{1}{2}$-count timer is cleared. The software then checks for the next $\frac{1}{2}$-track crossing. When this occurs, the $\frac{1}{2}$-count timer and counter are read and cleared. The actual velocity of the seek actuator is then found using the number of $\frac{1}{2}$-tracks counted by the $\frac{1}{2}$-count counter and the time found in the $\frac{1}{2}$-count timer. After this actual velocity is calculated, the short seek routine is utilized, in which the steps of FIGS. 5A and 5B for for this routine are conducted. During the time that the $\frac{1}{2}$-count is being used and after the 640 microsecond time-out, the software checks for the receipt of the next 16-count to update or adjust the track count.

Figure 7A:
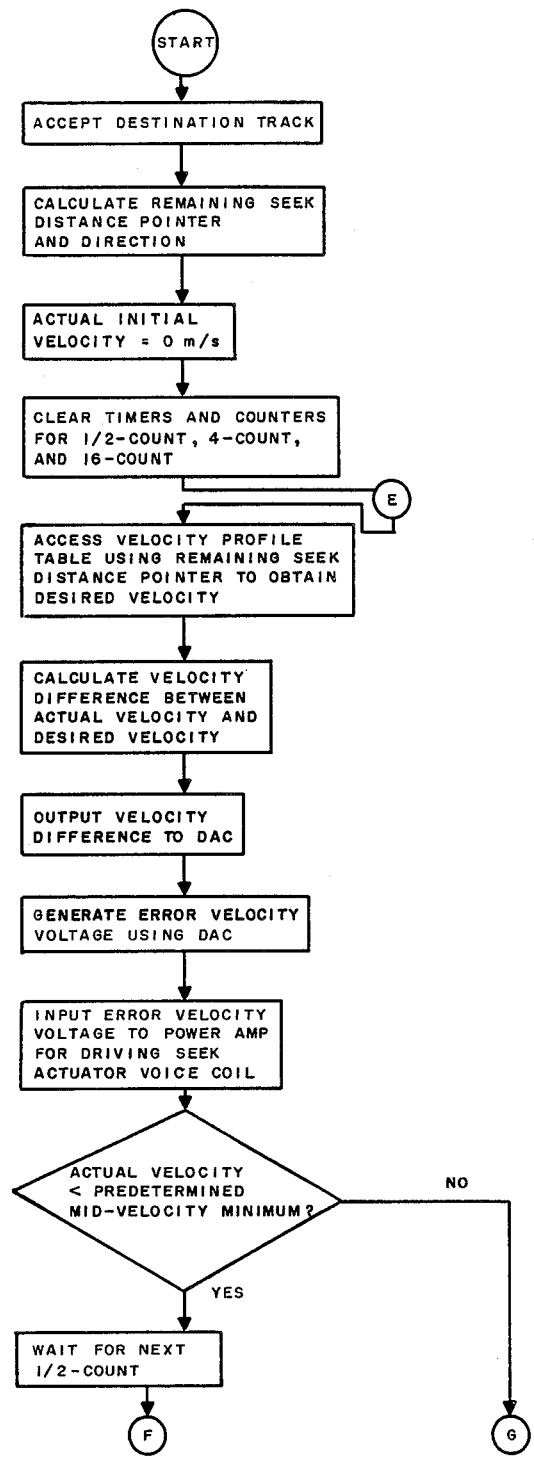
FIGS. 7A-7B are a diagram relating to a different embodiment of the present invention outlining steps associated with performing a long seek operation using a 4-count method.
Figure 7B:
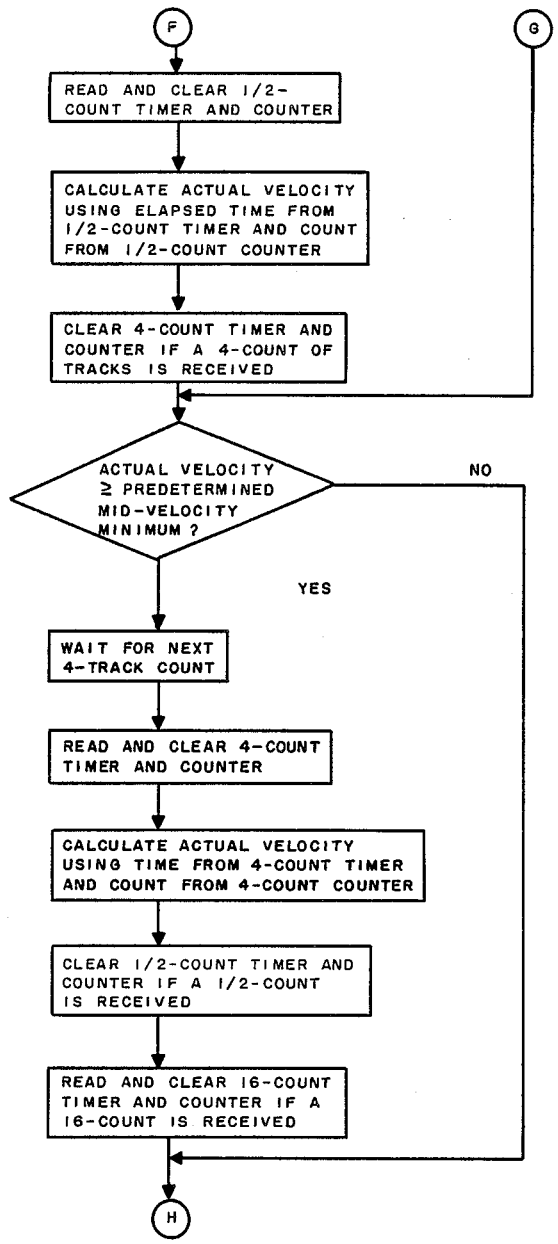
Figure 7C:
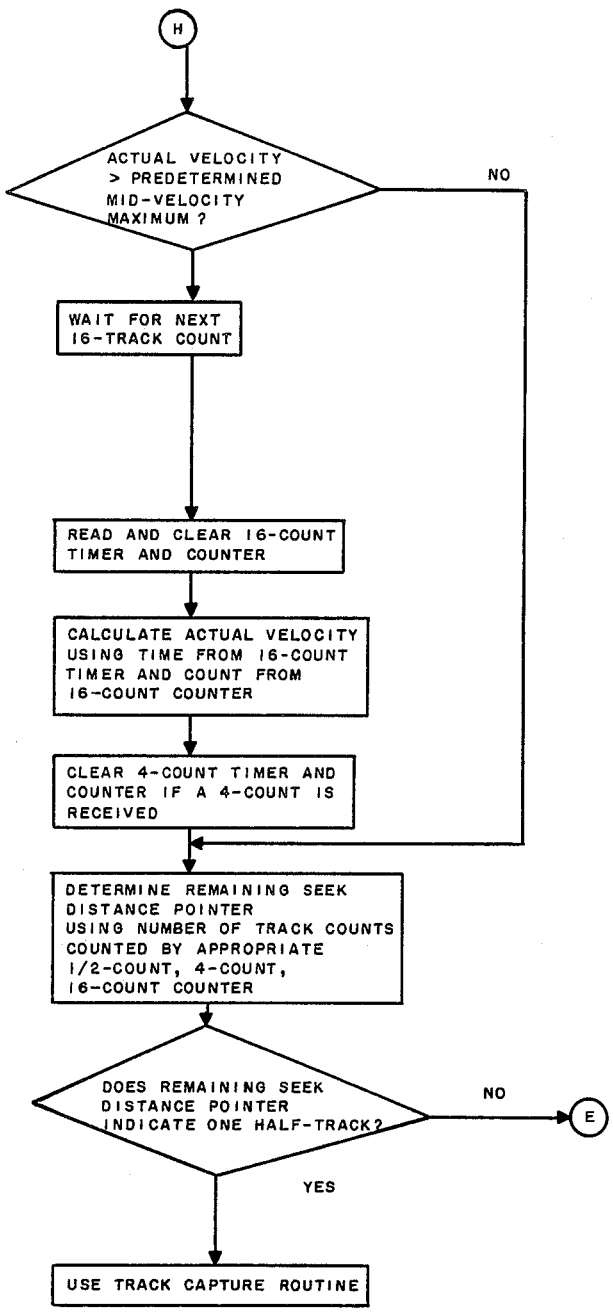

Another preferred method for the long seek operation concerns the use of a third track counting method for use in determining actual seek actuator velocity. With reference to the diagram of FIGS. 7A-7C, a 4-count method is utilized for track counting to provide overlap between the $\frac{1}{2}$-count method and the 16-count method. The 4-count method of track counting could be used between seek actuator velocities of 37.5 mm/s and about 75 mm/s. It has been determined that the minimum velocity for the four track count to avoid underdamping would be about 18 mm/s and the maximum velocity for the four track count before folding problems would occur is about 300 mm/s.

In implementing the seek operation that relies on $\frac{1}{2}$-counts, 4-counts and 16-counts, certain predetermined velocities or range of velocities are defined. With reference to the step diagram of FIGS. 7A-7C a mid-velocity minimum and a mid-velocity maximum are defined. In one embodiment, the mid-velocity minimum is a velocity value which is half way between the maximum $\frac{1}{2}$-count velocity (37.5 mm/s) and the minimum 4-count velocity (about 18 mm/s). Similarly, the mid-velocity maximum is a velocity value half way between the maximum 4-count velocity (300 mm/s) and the minimum 16-count velocity (about 75 mm/s).

Keeping these definitions in mind, the steps associated with this method include the initial steps of accepting the destination track, calculating the remaining seek distance pointer and direction using the current position and the destination or desired track, with the seek actual velocity currently at zero m/s, i.e., the seek actuator currently following a track on the disk. The timers and counters associated with the $\frac{1}{2}$-count, 4-count and 16-count are cleared under software control. A desired velocity value is found using a velocity profile table and the previously calculated remaining seek distance pointer. A velocity difference is found between the actual velocity (zero m/s) and the desired velocity. This velocity difference is outputted through the digital-analog converter. The digital-analog converter provides an error velocity voltage to a power amp used to drive the voice coil of the seek actuator.

The software also makes a determination as to whether or not the actual velocity of the seek actuator is less than or greater than or equal to a mid-velocity minimum and whether the actual velocity is greater than a mid-velocity maximum. As the diagram of FIGS. 7A–7C indicates, depending upon the current value of the actual velocity, one of the ½, 4, 16 timers and counters is utilized to calculate the next actual seek actuator velocity. In one embodiment, upon determining the current actual velocity, the remaining seek distance pointer is found using whichever of the ½, 4 or 16 counter is appropriate for the current actuator velocity. That is, in this embodiment, if the actual velocity is less than the mid-velocity minimum, the ½-count counter is used to determine the remaining seek distance pointer. If the actual velocity is greater than or equal to the mid-velocity minimum, the 4-count counter is used to determine the remaining seek distance pointer. If the actual velocity is greater than the mid-velocity maximum, the 16-count counter is used to determine the remaining seek distance pointer.

Other embodiments could be utilized to identify the appropriate counter for determining the remaining seek distance pointer. For example, if the remaining seek distance pointer is greater than thirty-two tracks, the 16-count counter could be used for subsequent determinations of the remaining seek distance pointer until the remaining seek distance was less than thirty-two tracks. Upon determining that the remaining seek distance is less than thirty-two tracks, the ½-count counter could then be used for determining the remaining seek distance pointer. In such a case, the velocity profile table and servo control would be set up such that the actual seek actuator velocity is under the maximum velocity associated with the ½-count when the remaining seek distance pointer becomes less than thirty-two tracks. In another example or embodiment that relates to the first example, all of the ½, 4 and 16 counters are utilized. Specifically, when the remaining seek distance pointer is greater than two hundred and fifty-six tracks, the 16-count counter is subsequently used to determine the remaining seek distance pointer. For remaining seek distances between thirty-two and two hundred and fifty-six tracks, the 4-count counter is subsequently used to determine the next remaining seek distance pointer. For less than thirty-two tracks remaining, the ½-count counter is subsequently used for the next determination of the remaining seek distance pointer.

In conjunction with such counting methods, to avoid count inaccuracies or "glitches" in changing from one velocity zone to another, the count of the current zone is used to determine velocity; while the count of the previous zone is used to determine distance remaining to the destination track, until the next count associated with the previous zone is received. For example, in connection with the 4-count boundary and when coming from the mid-velocity region to the low velocity region, the ½-count is used to determine velocity while distance is determined using the 4-count until the next 4-count is received. When the next 4-count is received, it is used to determine the remaining seek distance pointer and then the ½-count is subsequently used to determine the remaining seek distance pointer until the destination track is reached.

With regard to providing servo information for achieving the 4-count method, an implementation similar to the implementation associated with the 16-count method could be utilized. By way of example, a pit could be formed or stored in a first servo byte position, such as position 8. The poisition of this pit would then change four tracks later so that it is found in position 7 of the servo byte. This alternating location of the pit would continue for successive zones or sets of four tracks. The detection circuitry 30 would detect the modulation of the returned light beam and such information would be used in determining that four tracks had been crossed by the light beam 14.

With respect to other related embodiments, a 32-count method for track counting could be utilized in order to achieve even greater seek velocities than is allowed by the upper limit boundary associated with the 16-count method. That is, if it is desirable to have seek actuator velocities greater than 1200 mm/s, a 32-count method of track counting would be utilized. In such a method, the pit that is changed in location between positions 3 and 4 of the servo byte, would alternate every thirty-two tracks, instead of sixteen tracks. It has been determined that the minimum seek actuator velocity associated with the 32-count method is about 147 mm/s and the maximum velocity associated with the thirty-two track method is about 2400 mm/s. From this it can be appreciated that a third track counting method would be required to bridge the velocity gap region to the ½-count method. The 4-count method could be utilized, for example, in conjunction with the 32-count method and the ½-count method.

In another embodiment, instead of the 16-count method for track counting, an 8-count method might be incorporated. Such a method would effectively eliminate the velocity gap problem associated with the 16-count method. The 8-count method, however, would significantly reduce the maximum velocity achievable by the seek actuator 20, without a folding problem occuring. In such a case, the maximum actuator velocity associated with the 8-count method would be about 600 mm/s and would thus limit the minimum achievable access time to the desired or target track.

Figure 8A:
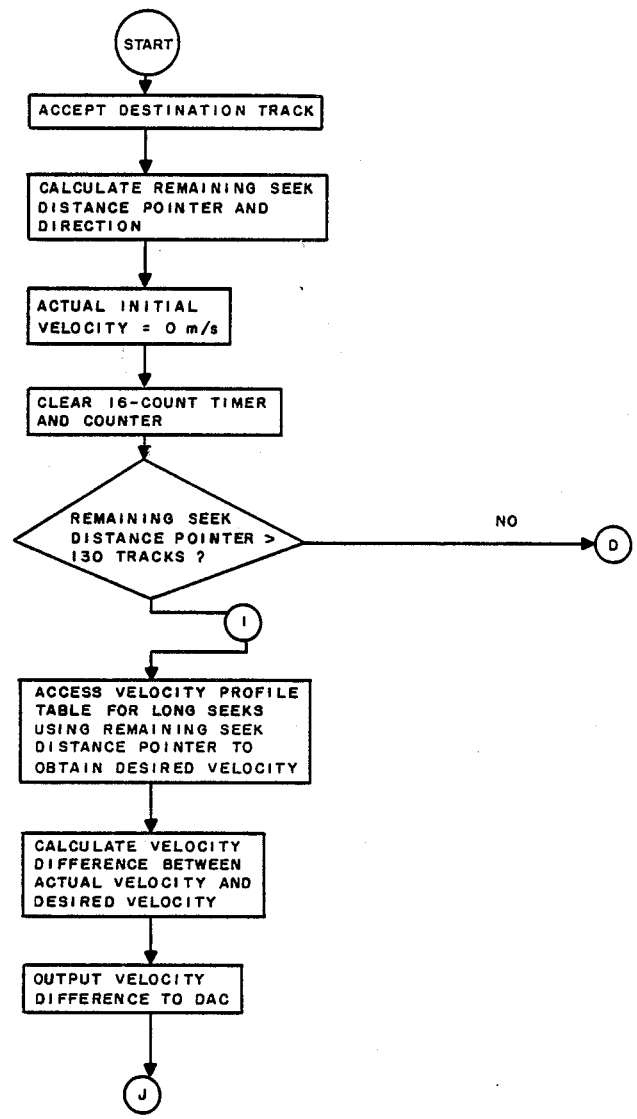
FIGS. 8A-8B are a diagram relating to still another embodiment outlining steps associated with using a cosine direction signal to perform a long seek operation.
Figure 8B:
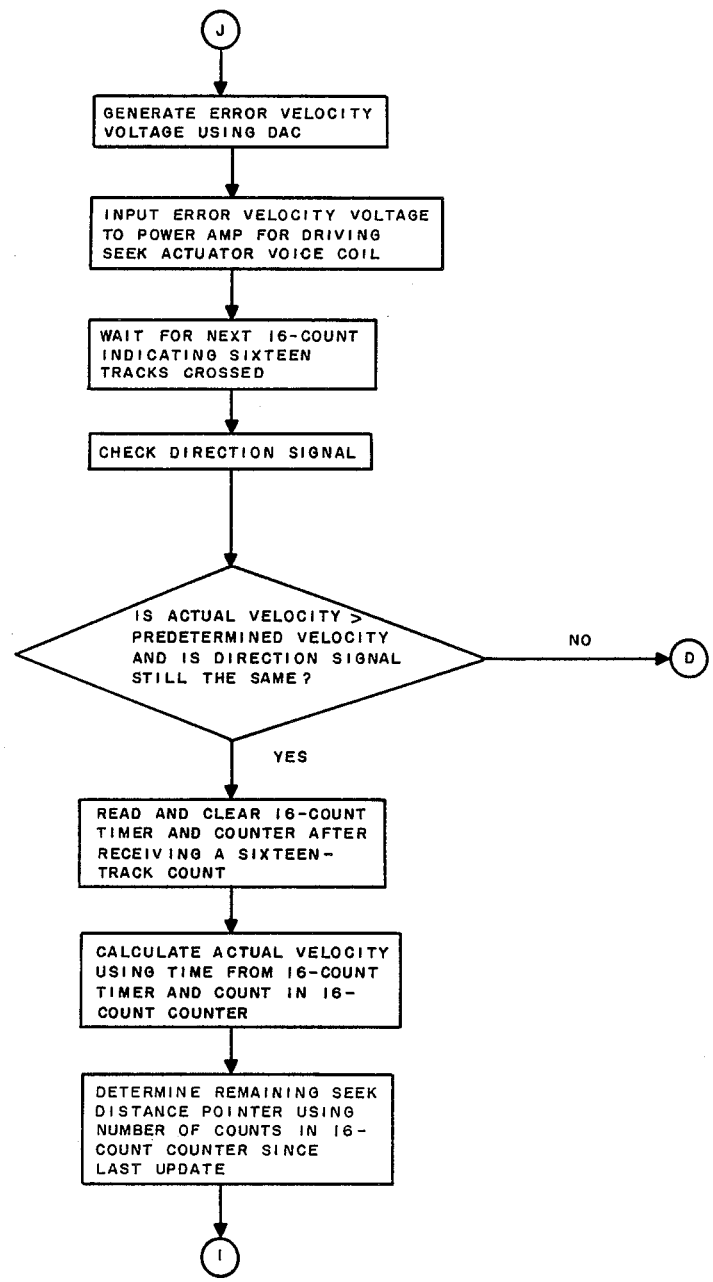

Another embodiment associated with track counting in the velocity gap region is next discussed with reference to the diagram of FIGS. 8A–8B. This method involves switching from the 16-count method to the ½-count method, during deceleration of the seek actuator in the velocity gap region, upon recognition of a reversal of a direction signal derived from cosine and sine signals generated by wobble pits located along the disk tracks and if the actual seek actuator velocity is less than a predetermined value, e.g., folding velocity (about 75 mm/s)−margin (about 15 mm/s)=60 mm/s. When the direction signal changes, it is an indication that the seek actuator velocity is passing the folding or predetermined maximum velocity associated with the ½-count method. Upon detection of this reversal of the direction signal, the ½-count method is used for track counting instead of the 16-count method. This embodiment is employed as a substitution for the use of the 640 microsecond time-out previously discussed. In connection with an understanding of the direction signal, as well as the aforesaid cosine and sine signals, reference is made to U.S. Patent application Ser. No. 902,278, filed Aug. 28, 1986, and assigned to the same assignee as the present invention. The disclosure of Ser. No. 902,278 is incorporated herein by reference. As can be understood from the diagram of FIGS. 8A–8B, this long seek operation is similar to that outlined in FIGS. 6A and 6B. The major difference lies in the use of checking steps to determine whether the reversal of the direction signal has occurred and whether the actual velocity is less than a predetermined velocity or value.

Figure 9A:
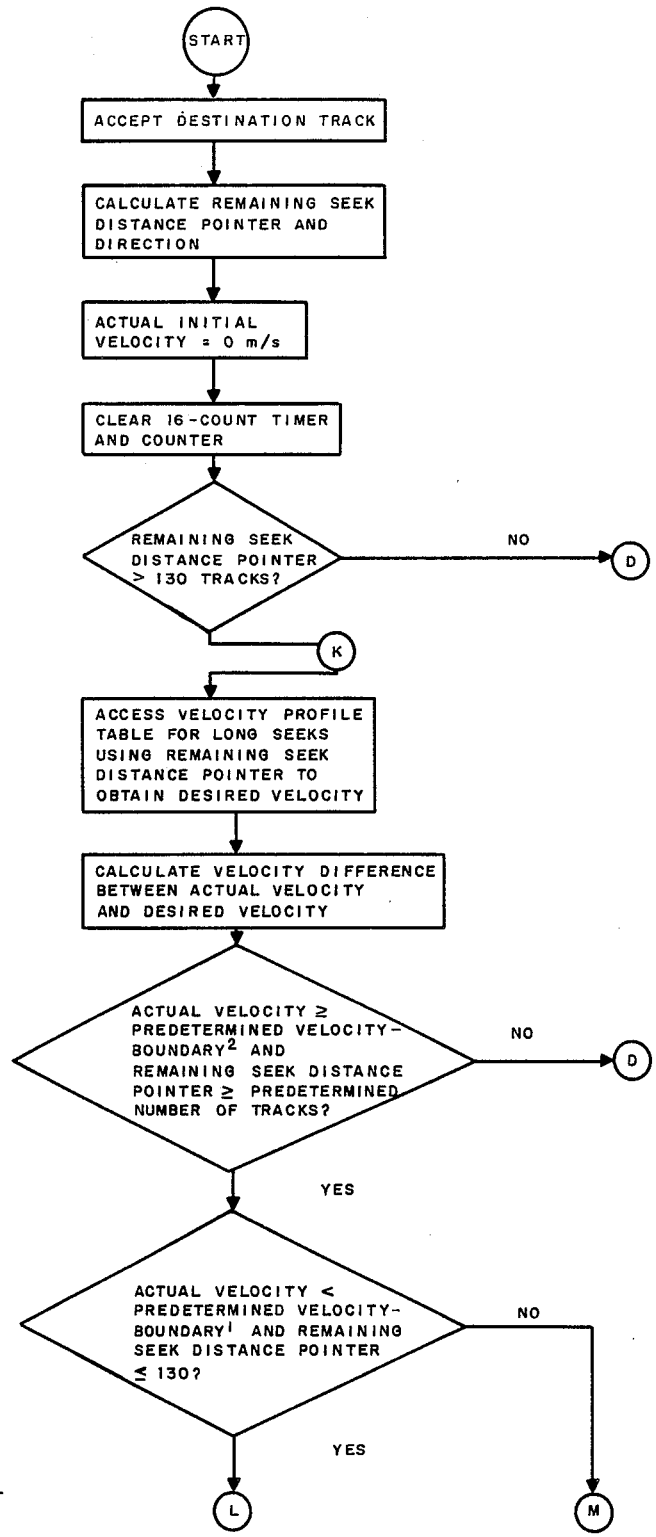
FIGS. 9A-9B are a diagram relating to yet another embodiment of the present invention outlining steps associated with performing a long seek operation by lowering loop gain.
Figure 9B:
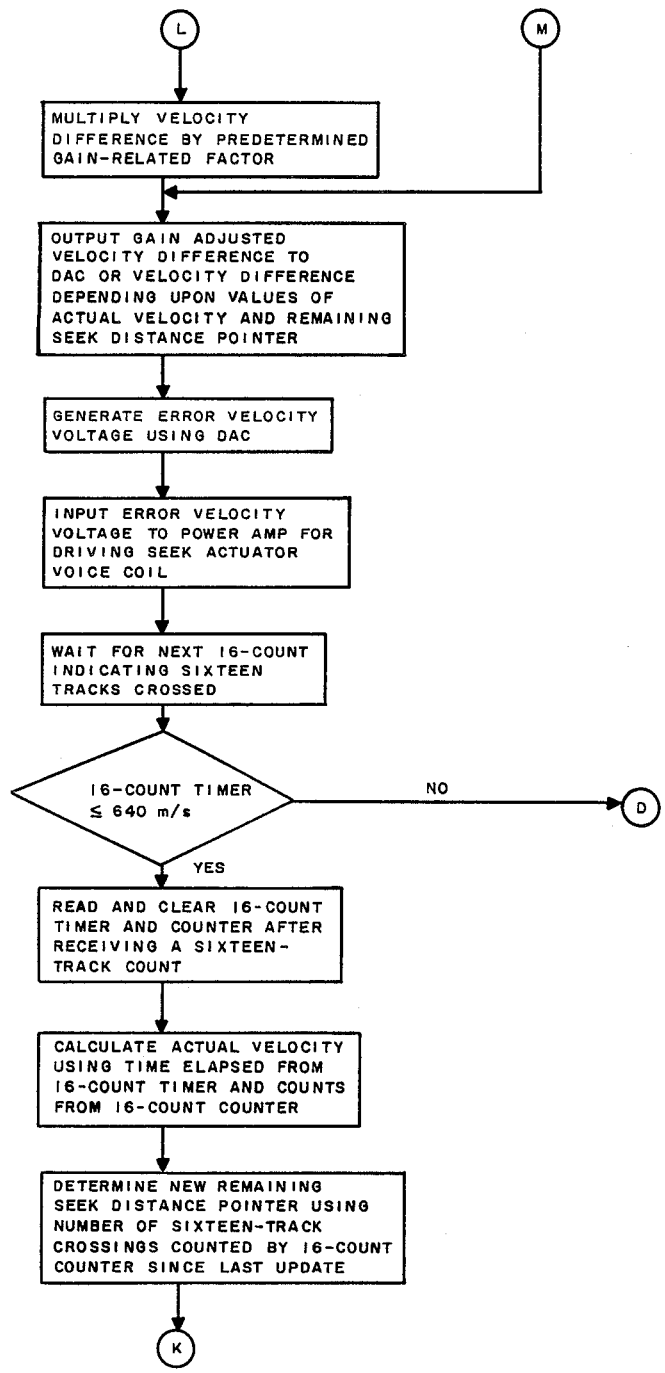

With regard to still another embodiment, the underdamping associated with the 16-count method in the velocity gap region is overcome or reduced by lowering the gain of the servo loop system 24 when the seek actuator velocity corresponds to one or more of the velocities in the velocity gap region. With reference to FIGS. 9A–9B, the preferred steps are outlined for implementing this embodiment. As can be understood, this method involves making the same initial determinations as found in long seek methods. This method is different in the use of two different predetermined values relating to actual seek actuator velocity. A velocity-boundary1 and a velocity-boundary2 is somewhere between 25–37.5 mm/s.

Using the calculated remaining seek distance pointer, the velocity profile table for long seeks is accessed to obtain a desired velocity. The difference between the desired velocity and the actual velocity of the seek actuator is determined. In the next step of this embodiment, if the actual velocity is less than velocity-boundary2, a jump is made out of the long seek routine if the actual velocity is less than velocity-boundary1 and if the remaining seek distance pointer is less than a predetermined number of tracks, e.g., 130 tracks, the velocity difference previously obtained is multiplied by a predetermined factor. This predetermined factor is less than 1 and might, for example, be equal to 0.5. In the case in which the actual velocity is less than velocity-boundary1 and the remaining seek distance is less than the predetermined number of tracks, this factor or gain adjusted velocity difference is applied to a digital-analog converter (DAC). The DAC generates an error velocity voltage, which is fed to a power amp for driving the voice coil of the seek actuator. The software then checks for the receipt of the next sixteen track crossing count using the 16-count counter. Upon receiving the next 16-track count, the 16-count timer and counter are read and cleared. The actual seek actuator velocity is determined from the elapsed time found in the counter and the number of sixteen track counts found in the 16-count couter. The remaining seek distance pointer is obtained using the number of counts in the 16-count counter since the last update. Using the number of counts, a new remaining seek distance pointer is obtained for accessing the velocity profile table. These steps can then be repeated. In one embodiment, during the time that a check is being made for the next 16-count indicating that sixteen tracks have been crossed, the timer is checked to determine whether or not it has exceeded the 640 microsecond time-out. If so, an exit is made from the long seek routine.

When the exit is made from the long seek routine, the software keeps checking for the first 16-count and, when received, updates the remaining seek distance pointer. Simultaneously, the software waits for the receipt of the next ½-count indicating that a ½ track has been crossed. At this time, the ½-count timer is cleared and a check is made for the receipt of the next ½-count. Upon receipt of this next ½-count, the ½-count timer and counter are read and cleared. Using the information in the timer and counter, the actual velocity of the seek actuator is then calculated. After this determination, the short seek routine is entered and is used until the track is captured.

Figure 10A:
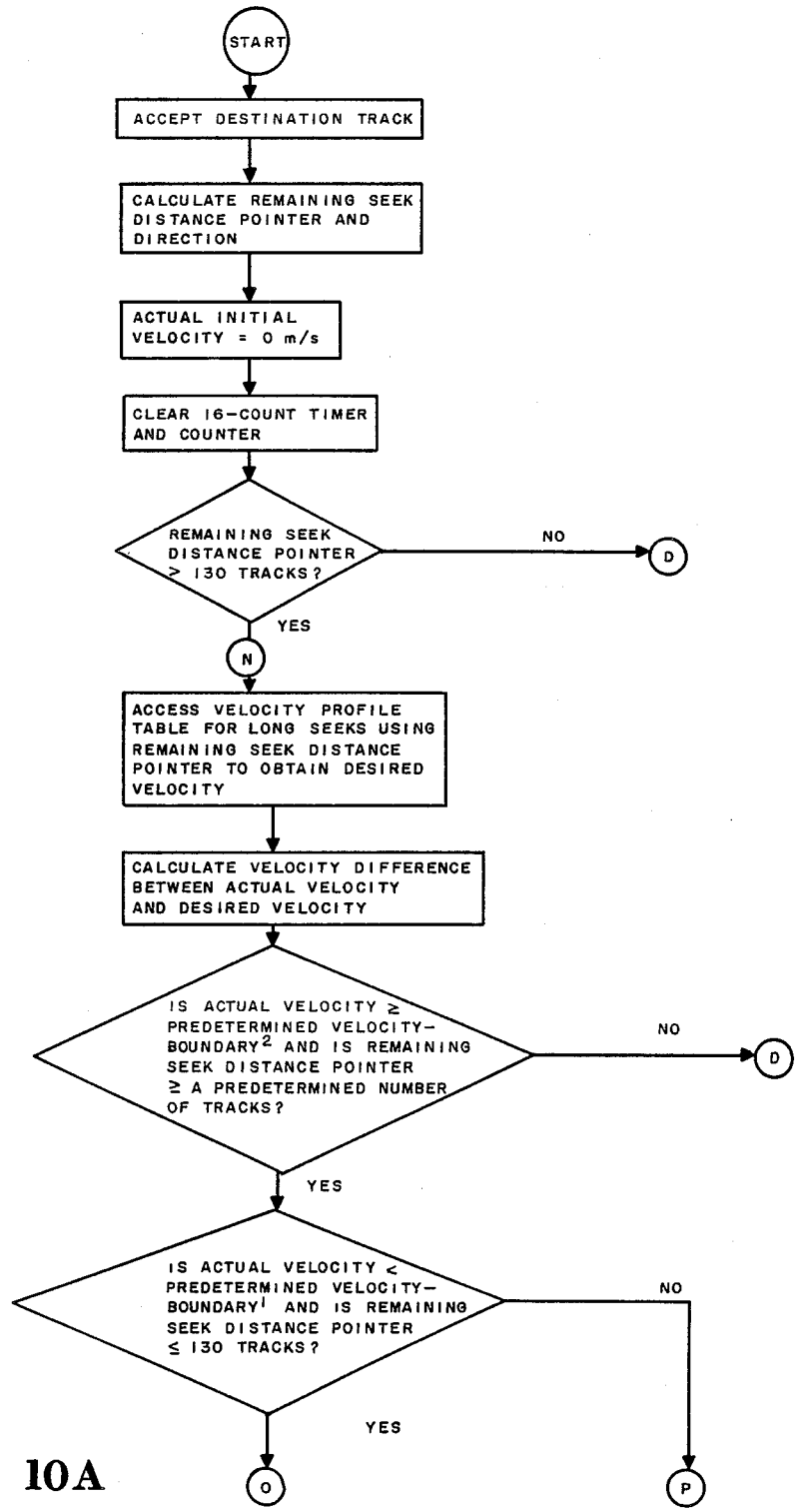
FIGS. 10A-10B are a diagram relating to still yet another embodiment outlining steps associated with performing a long seek determining actual velocity operation by controlling an actuator so that it achieves constant deceleration in the velocity gap region.
Figure 10B:
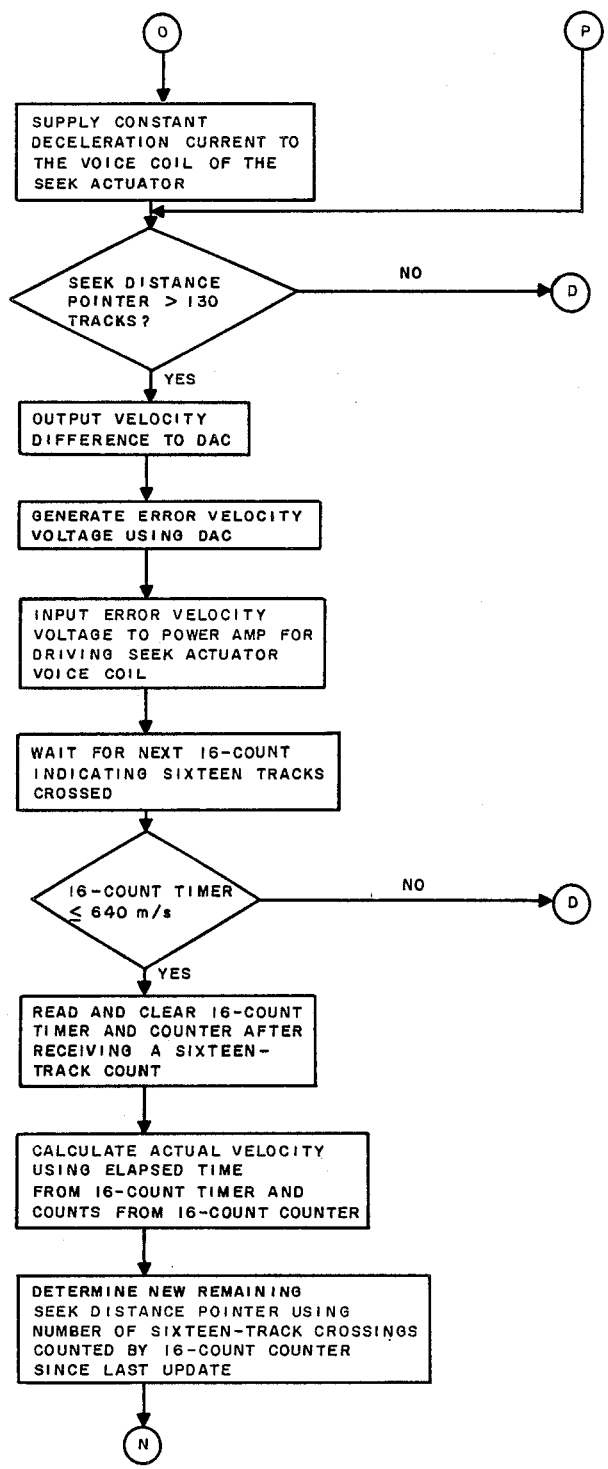

In still yet another embodiment used in controlling seek actuator velocity in the velocity gap region during actuator decleration, reference is made to the steps of FIGS. 10A–10B. This embodiment relates to controlling the energization of the voice coil of the seek actuator 20 in that a constant deceleration current is supplied to the coil during the time that the actuator is decelerating through the velocity gap region. Unlike the method of FIGS. 6A and 6B, a velocity error signal is not found and no velocity feedback is utilized. Instead, the coil is supplied with a constant current until an actual velocity of the seek actuator is determined that is equal to or less than the predetermined maximum velocity associated with the ½-count method. This method also does not require the use of a velocity profile table in the velocity gap region.

As seen in FIGS. 10A and 10B, the steps for implementing this embodiment are similar to the embodiment of FIGS. 9A and 9B. Two velocity boundary values, namely, velocity-boundary1 and velocity-boundary2 are defined. During deceleration and when the actual velocity is less than the velocity-boundary1 having a velocity value of somewhere between 70–100 mm/s, then a constant current is supplied to the voice coil of the seek actuator, until the actual velocity of the seek actuator is less than velocity-boundary2 having a velocity value of somewhere between 25–37.5 mm/s. In another embodiment, as with the previous embodiment, the timer is checked to determined whether the 640 microsecond time-out has occurred. If so, an exit is made from the long seek routine. As can be understood from the diagram of FIGS. 10A and 10B, during the time that a constant deceleration current is supplied to the coil, no error velocity voltage is generated by the digital-analog converter.

Based on the detailed description of the foregoing embodiments, a number of worthwhile features of the present invention are readily discerned. The controlled track seek operation of the present invention relies only on servo information stored on the disk. No external sensors for counting tracks crossed is utilized. The amount of servo information necessary to perform the track seeking operation is reduced inasmuch as continuous seek information is not required. Instead, sampled seek information can be accessed for providing accurate track counting used in controlling the velocity of a seek actuator. In achieving these major features, problems associated with folding and an underdamped servo loop system have been overcome or compensated for. In situations in which a velocity gap region is established because of counting methods employed, various solutions have been devised or proposed to maintain desired velocity feedback in the servo, while avoiding an underdamped servo loop system. Many of the devised solutions can be readily implemented primarily using software so that additional and/or complicated hardware is not required.

The foregoing discussion of the invention including the numerous embodiments has been presented for purposes of illustration and description. They are not intended to be exhaustive or to limit the invention to the precise form disclosed, and other modifications and variations may be possible in light of the above teachings. The embodiments were chosen and described in order to best explain principles associated with the invention and its practical application to thereby enable others of ordinary skill in the art to best utilize the invention in further various embodiments and various modifications as are suited to the particular use contemplated. It is intended that the appended claims be construed to include other alternative embodiments of the invention except insofar as limited by the prior art.

What is claimed is:

1. A method for use in track seeking using discontinuous information found along disk tracks, comprising:
providing a disk having at least first and second sets of discontinuous servo patterns used in track counting;
providing actuator means used in moving read/write means relative to said disk;
determining a magnitude relating to actual velocity of said actuator means using a first method and said first set of servo patterns found on the disk when said actual velocity of said actuator means is less than a first predetermined value;
determining a magnitude relating to actual velocity of said actuator means using a second method and said second set of servo patterns found on the disk when said velocity of said actuator means is greater than a second predetermined value, said second predetermined value being different from said first predetermined value; and
controlling said actual velocity of said actuator means using a third method when said actual velocity is greater than said first predetermined value and less than said second predetermined value.

2. A method, as claimed in claim 1, wherein:
said third method includes determining a magnitude relating to actual velocity using said second method of determining a magnitude relating to actual velocity of said actuator means and monitoring time during said controlling step.

3. A method, as claimed in claim 2, wherein:
said monitoring time includes determining whether an amount of elapsed time relating to disk tracks crossed exceeds a predetermined amount of time.

4. A method, as claimed in claim 3, wherein:
said step of controlling includes switching from said second method to determine a magnitude relating to actual velocity of said actuator means to said first method when said actual velocity is less than said first predetermined value.

5. A method, as claimed in claim 1, wherein:
said using said first method includes counting tracks crossed using said first set of servo patterns found on said disk associated with ½ tracks crossings.

6. A method, as claimed in claim 1, wherein:
said using of said second method includes using said second set of servo patterns found on said disk associated with a predetermined number of radially adjacent tracks, said predetermined number being greater than one.

7. A method, as claimed in claim 6, wherein:
said predetermined number is sixteen.

8. A method, as claimed in claim 6, wherein:
said third method includes monitoring time that elapses during the crossing from one set of said predetermined number of tracks to a second set of said predetermined number of tracks in order to determine the amount of time that has passed since the last track count was obtained using said second method.

9. A method, as claimed in claim 1, wherein said controlling step includes:
establishing velocity profile means;
using said velocity profile means to determine a desired velocity; and
comparing said desired velocity with said actual velocity of said actuator means.

10. A method, as claimed in claim 9, wherein:
said velocity profile means is established wherein said actuator means has a substantially constant deceleration when said actual velocity is controlled using said third method and when said actual velocity of said actuator means is less than said second predetermined value.

11. A method, as claimed in claim 1, wherein:
said step of controlling said actual velocity includes causing said actuator means to accelerate at a magnitude that is substantial in comparison with disturbances that could affect proper servo operation during acceleration of said actuator means and when said actual velocity is between about said first predetermined value and said second predetermined value.

12. A method for use in controlled track seeking, comprising:
defining a first method for counting the number of track crossings relative to disk means using discontinuous servo information;
determining a magnitude relating to actual velocity of actuator means when said actual velocity is less than a first predetermined velocity value using said first method for counting track crossings;
defining a second method for counting the number of tracks crossings relative to disk means using discontinuous servo information;
determining a magnitude relating to a actual velocity of actuator means when said actual velocity of said actuator means is greater than a second predetermined velocity value using said second method for counting track crossings; and
establishing a gap velocity region defined by velocities of said actuator means between said first predetermined velocity value and said second predetermined velocity value.

13. A method, as claimed in claim 12, further comprising:
counting tracks crossed using said second method when passing through said velocity gap region.

14. A method, as claimed in claim 12, wherein:
said second method includes counting tracks using an alternating pit position of a servo byte located on disk means.

15. A method, as claimed in claim 14, further including:
defining a third method to determine actual velocity of said actuator means and wherein said third method includes monitoring elapsed time between occurrence of alternated pit positions.

16. A method, as claimed in claim 12, wherein:
said second method includes accessing velocity profile means which correlates magnitudes of velocity and tracks remaining to a sought track and wherein a range of velocities in said velocity profile means correlates to substantially constant deceleration of said actuator means.

17. A method for use in controlled track seeking, comprising:
defining a first method to determine a magnitude relating to actual velocity of actuator means when said actual velocity is less than a first predetermined velocity value, said first predetermined velocity value relating to a velocity value at about which folding occurs;

defining a second method to determine a magnitude relating to actual velocity of actuator means when said actual velocity of said actuator means is greater than a second predetermined velocity value; and establishing a gap velocity region defined by velocities of said actuator means between said first predetermined velocity value and said second predetermined velocity value.

18. A method for use in controlled track seeking, comprising:

defining a first method to determine a magnitude relating to actual velocity of actuator means when said actual velocity is less than a first predetermined velocity value;

defining a second method to determine a magnitude relating to actual velocity of actuator means when said actual velocity of said actuator means is greater than a second predetermined velocity value, said second predetermined velocity value relating to a velocity value at about which unwanted servo loop under-damping occurs; and establishing a gap velocity region defined by velocities of said actuator means between said first predetermined velocity value and said second predetermined velocity value.

19. A method, as claimed in claim 12, further comprising:

defining a third method to determine a magnitude relating to actual velocity of said actuator means when said actual velocity is greater than said first predetermined velocity value and less than said second predetermined velocity value, said third method includes counting tracks using alternating pit position information.

20. A method, as claimed in claim 19, wherein:
saiid pit position information alternates every four tracks for at least a predetermined number of tracks.

21. A method, as claimed in claim 12, further comprising:
using said first method to count tracks crossed when passing through said velocity gap region.

22. A method, as claimed in claim 12, wherein:
said first method includes accessing velocity profile means that correlates magnitudes of velocity and tracks remaining to a sought tracks and, for track distances less than a predetermined number of tracks from said sought track, use of said velocity profile means results in a substantially constant velocity of said velocity actuator means until about when said sought track is reached.

23. A method for use in controlled track seeking, comprising:

defining a first method to determine a magnitude relating to actual velocity of actuator means when said actual. velocity is less than a first predetermined velocity value;

defining a second method to determine a magnitude relating to actual velocity of actuator means when said actual velocity of said actuator means is greater than a second predetermined velocity value;

establishing a gap velocity region defined by velocities of said actuator means between said first predetermined velocity value and said second predetermined velocity value; and lowering servo loop gain when passing through said velocity gap region.

24. A method, as claimed in claim 12, further comprising:
driving said seek actuator means with current that provides substantially constant deceleration of said seek actuator means when passing through said velocity gap region.

25. A method, as claimed in claim 12, further comprising:
using pits to develop a wobble signal and a cosine signal to determine the passing of said first predetermined velocity value.

26. A method, as claimed in claim 25, wherein:
said first method includes using a change in direction signal derived using said cosine signal.

27. An apparatus for use in a controlled track seek operation comprising:

disk means having at least first and second sets of discontinuous servo patterns used in track counting:

read/write means operatively associated with said disk means for use in reading from and writing on said disk means;

actuator means operatively associated with said read/write means for use in moving at least portions of said read/write means; and processing means communicating with said read/write means for processing information received from said servo patterns and controlling said actuator means, said processing means including first means for determining a magnitude relating to actual velocity of said actuator means when the velocity of said actuator means is greater than a first predetermined velocity value using said first set of servo patterns, second means for determining a magnitude relating to actual velocity of said actuator means when the velocity of said actuator means is less than a second predetermined velocity value using said second set of servo patterns, and third means for determining a magnitude relating to actual velocity of said actuator means when said velocity is greater than said first predetermined velocity value and less than said second predetermined velocity value.

28. An apparatus, as claimed in claim 27, wherein:
said third means includes at least portions of said second means.

29. An apparatus, as claimed in claim 27, wherein:
said first set of servo patterns includes information for counting the crossing of ½ track.

30. An apparatus, as claimed in claim 29, wherein:
said first set of servo patterns includes means for generating a wobble signal.

31. An apparatus, as claimed in claim 27, wherein:
said second set of servo patterns includes information for counting a predetermined number of tracks crossed, said predetermined number being greater than one.

32. An apparatus, as claimed in claim 31, wherein:
said predetermined number of tracks crossed is at least sixteen tracks.

33. An apparatus, as claimed in claim 27, wherein:
said third means includes means for monitoring time elapsed between counts of a predetermined number of tracks crossed.

34. An apparatus, as claimed in claim 33, wherein:

said means for monitoring monitors the time between counting of sixteen tracks crossed.

35. An apparatus, as claimed in claim 27, wherein:
at least some of said second set of servo patterns includes a pit that alternates its position in a servo byte for every first predetermined number of tracks for a plurality of tracks.

36. An apparatus, as claimed in claim 35, wherein:
said disk means includes a third set of servo patterns.

37. An apparatus, as claimed in claim 36, wherein:
said third means includes means for determining said magnitude relating to actual velocity of said actuator means when said actual velocity is greater than said first predetermined velocity value and less than said second predetermined velocity value using at least portions of said third set of servo patterns.

38. An apparatus, as claimed in claim 37, wherein:
at least some of said third set of servo patterns includes pits alternating every second predetermined number of tracks for a plurality of tracks, said second predetermined number of tracks being less than said first predetermined number of tracks.

39. An apparatus, as claimed in claim 27, wherein:
said second means includes velocity profile means correlating magnitudes of velocity and tracks remaining to a sought track and wherein a number of velocities in said velocity profile means correspond to substantially constant deceleration of said actuator means.

40. An apparatus, as claimed in claim 27, wherein:
said first means includes means for updating said magnitude relating to actual velocity of said actuator means twice for each track crossed.

41. An apparatus, as claimed in claim 27, wherein:
said second means includes means for processing a count of sixteen tracks crossed.

42. An apparatus, as claimed in claim 27, wherein:
said third means includes means for driving said actuator means with a substantially constant deceleration current.

43. An apparatus for use in a controlled track seek operation comprising:
disk means having at least first and second sets of information used in track counting;
read/write means operatively associated with said disk means for use in reading from and writing on said disk means;
actuator means operatively associated with said read/write means for use in moving at least portions of said read/write means; and
processing means communicating with said read/write means for processing information received from said disk means and controlling said actuator means, said processing means including first means for determining a magnitude relating to actual velocity of said actuator means when the velocity of said actuator means is greater than a first predetermined velocity value, second means for determining a magnitude relating to actual velocity of said actuator means when the velocity of said actuator means is less than a second predetermined velocity value, and third means for determining a magnitude relating to actual velocity of said actuator means when said velocity is greater than said first predetermined velocity value and less than said second predetermined velocity value, said third means including means for lowering loop gain in connection with actual velocities of said actuator means greater than said first predetermined velocity value and less than said second predetermined velocity.

44. An apparatus, as claimed in claim 27, wherein:
said third means includes means for developing a cosine signal using at least some of said first set of servo patterns to determine when said actual velocity of said actuator means is less than said second predetermined velocity value.

* * * * *